(12) United States Patent
Liu et al.

(10) Patent No.: US 9,559,875 B2
(45) Date of Patent: Jan. 31, 2017

(54) BLIND EQUALIZATION IN A SINGLE CARRIER WIDEBAND CHANNEL

(75) Inventors: Daniel N. Liu, Torrance, CA (US); Michael P. Fitz, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 74 days.

(21) Appl. No.: 13/467,394

(22) Filed: May 9, 2012

(65) Prior Publication Data

US 2013/0301697 A1    Nov. 14, 2013

(51) Int. Cl.
*H04L 25/03* (2006.01)

(52) U.S. Cl.
CPC ..... *H04L 25/0305* (2013.01); *H04L 25/03038* (2013.01); *H04L 2025/0342* (2013.01); *H04L 2025/03407* (2013.01); *H04L 2025/03636* (2013.01)

(58) Field of Classification Search
CPC ............ H04L 2025/03402; H04L 2025/03636; H04L 25/0305
USPC ......................................... 375/229, 232, 234
See application file for complete search history.

(56) References Cited

U.S. PATENT DOCUMENTS

| | | | | |
|---|---|---|---|---|
| 4,053,837 A | * | 10/1977 | Ryan et al. | 375/235 |
| 5,537,419 A | * | 7/1996 | Parr et al. | 370/350 |
| 5,602,872 A | * | 2/1997 | Andrews | 375/234 |
| 5,706,057 A | * | 1/1998 | Strolle et al. | 375/240.01 |
| 5,793,807 A | * | 8/1998 | Werner et al. | 375/233 |
| 5,809,074 A | * | 9/1998 | Werner et al. | 375/233 |
| 5,848,105 A | * | 12/1998 | Gardner et al. | 375/336 |
| 6,067,319 A | * | 5/2000 | Copeland | 375/232 |
| 6,115,433 A | * | 9/2000 | de Lantremange | 375/326 |
| 6,252,903 B1 | * | 6/2001 | Werner et al. | 375/232 |
| 6,694,280 B2 | | 2/2004 | Lai | |
| 7,027,500 B1 | * | 4/2006 | Casas et al. | 375/232 |

(Continued)

FOREIGN PATENT DOCUMENTS

WO    2004075469    9/2004

OTHER PUBLICATIONS

"Rolf Weber, Andreas Waldhorst, Florian Schulz, and Johann E Bohme", "Blind Receivers for MSK Signals Transmitted Through Shallow Water", IEEE 2001, hereinafter Weber.*

(Continued)

*Primary Examiner* — Kevin M Burd
(74) *Attorney, Agent, or Firm* — Patti & Malvone Law Group, LLC

(57) ABSTRACT

A blind equalizer apparatus includes a decision-directed (DD) least mean squares (LMS) blind equalizer. A blind equalizer apparatus includes: a DD LMS blind equalizer, wherein: the blind equalizer uses a finite impulse response filter with tap weights that are adaptively updated using a filter tap update algorithm, wherein blind equalization of one of an in-phase (I) channel and a quadrature (Q) channel is carried out by maximizing the Euclidean distance of binary modulated waveforms, wherein the blind equalizer averages a block to compute an independent phase estimate for a block, wherein the blind equalizer computes an error variable for a block from the phase estimate for the block, wherein the blind equalizer uses the phase estimate and alternating I/Q one dimensional/binary slicing to make a hard decision, and wherein the blind equalizer uses the hard decision to derive an error variable that is used to update the filter tap weights.

18 Claims, 8 Drawing Sheets

(56) References Cited

U.S. PATENT DOCUMENTS

| | | | |
|---|---|---|---|
| 7,031,405 B1* | 4/2006 | Touzni | H04L 27/0014 375/233 |
| 7,072,414 B1 | 7/2006 | Lui et al. | |
| 7,109,805 B2 | 9/2006 | Lee et al. | |
| 7,170,931 B2 | 1/2007 | Greiss et al. | |
| 7,330,505 B2* | 2/2008 | Fitton et al. | 375/229 |
| 7,352,795 B2 | 4/2008 | Furman et al. | |
| 7,508,884 B2 | 3/2009 | Nieto et al. | |
| 8,351,492 B2* | 1/2013 | Ly-Gagnon | 375/221 |
| 2002/0027953 A1 | 3/2002 | Hwang et al. | |
| 2002/0136329 A1* | 9/2002 | Liu et al. | 375/326 |
| 2003/0058967 A1* | 3/2003 | Lin et al. | 375/327 |
| 2005/0047802 A1* | 3/2005 | Jaynes et al. | 398/208 |
| 2005/0157781 A1* | 7/2005 | Ho et al. | 375/233 |
| 2006/0291553 A1* | 12/2006 | Nemer | 375/233 |
| 2007/0071139 A1* | 3/2007 | Arslan et al. | 375/340 |
| 2007/0217554 A1* | 9/2007 | Wetzker | 375/350 |
| 2008/0063043 A1* | 3/2008 | Xia et al. | 375/233 |
| 2009/0129458 A1* | 5/2009 | Pietraski et al. | 375/232 |
| 2010/0091832 A1* | 4/2010 | Haratsch | 375/233 |
| 2011/0230154 A1* | 9/2011 | Jacobsen | 455/205 |
| 2011/0236025 A1* | 9/2011 | Wagner et al. | 398/115 |
| 2011/0243575 A1 | 10/2011 | Yan et al. | |
| 2012/0099637 A1* | 4/2012 | Hu et al. | 375/232 |
| 2012/0257667 A1* | 10/2012 | Nentwig | 375/231 |

OTHER PUBLICATIONS

"Roberto Lopez-Valcarce", "Channel Equalization With Staggered Modulation Formats", IEEE 2002, hereinafter Valcarce).*

"J. L. Massey", "A Generalization of Binary Minimum Shift Keying and Staggered Quadriphase Shift Keying Modulation", Jet Propulsion Lab., California Inst. of Tech.; Communications Systems Research Section.; Pasadena, CA, United States Technical Report 1979, hereinafter Massey.*

A.A.M. Saleh; Frequency-Independent and Frequency-Dependent Nonlinear Models of TWT Amplifiers; IEEE Transactions on Communications; vol. COM-29, No. 11; pp. 1715-1720; Nov. 1981.

E. Casini et al; DVB-S2 Modem Algorithms Design and Performance Over Typical Satellite Channels; International Journal of Satellite Communications and Networking; vol. 22; pp. 281-318; Jan. 2004; John Wiley & Sons, Ltd.

M.C. Austin et al; QPSK, Staggered QPSK, and MSK-A Comparative Evaluation; IEEE Transactions on Communications; vol. COM-31, No. 2; pp. 171-182; Feb. 1983.

S.J. Simmons et al; Low Complexity Decoders for Constant Envelope Digital Modulations; IEEE Transactions on Communications; vol. COM-31, No. 12; pp. 1273-1280; Dec. 1983.

A. Svensson et al; A Class of Reduced-Complexity Viterbi Detectors for Partial Response Continuous Phase Modulation; IEEE Transactions on Communications; vol. COM-32, No. 10; pp. 1079-1087; Oct. 1984.

G.K. Kaleh; Simple Coherent Receivers for Partial Response Continuous Phase Modulation; IEEE Journal on Selected Areas in Communications; vol. 7, No. 9; pp. 1427-1436; Dec. 1989.

H.R. Mathwich et al; The Effect of Tandem Band and Amplitude Limiting on the Eb/N0 Performance of Minimum (Frequency) Shift Keying (MSK); IEEE Transactions on Communications; vol. COM-22, No. 10; pp. 1525-1540; Oct. 1974.

S.A. Gronemeyer et al; MSK and Offset QPSK Modulation; IEEE Transactions on Communications; vol. COM-24, No. 8; pp. 809-820; Aug. 1976.

S. Pasupathy; Minimum Shift Keying: A Spectrally Efficient Modulation; IEEE Communications Magazine; vol. 17; pp. 14-22; Jul. 1979.

G. M. Vitetta et al; Blind Detection of CPM Signals Transmitted over Frequency-Flat Fading Channels; IEEE Transactions on Vehicular Technology; vol. 47, No. 3; pp. 961-968; Aug. 1998.

O. Grellier et al; Blind Equalization and Source Separation with MSK Inputs; Part of the SPIE Conference Advanced Signal Processing Algorithms, Architectures and Implementations VIII; pp. 26-34; San Diego, CA; USA; Jul. 1998.

P. Comon et al; Closed-Form Blind Channel Identification with MSK Inputs; Proceedings Asilomar Conf. Signals, Systems and Computers, vol. 2; Pacific Grove, USA; pp. 1569-1573; Nov. 1998.

R. Weber et al; Blind Receivers for MSK Signals Transmitted Through Shallow Water; Oceans, MTS/IEEE Conference and Exhibition, vol. 4; Honolulu, USA; pp. 2183-2190; Nov. 2001.

P. Bianchi et al; On the Blind Equalization of Continuous Phase Modulated Signals Using the Constant Modulus Criterion; IEEE Transactions on Signal Processing; vol. 55, No. 3; pp. 1047-1061; Mar. 2007.

O. Dabeer et al; Convergence Analysis of the Constant Modulus Algorithm; IEEE Transactions on Information Theory; vol. 49, No. 6; pp. 1447-1464; Jun. 2003.

F.J.A. De Aquino et al; Widely Linear Prediction for Blind Equalization; ICC 2007 Conference; pp. 2985-2990; 2007.

P. Hua et al; A New Blind Equalizer for High Order QAM System; Proceedings of ICSP '98; 0-7803-4325; pp. 445-448; May 1998.

A. Bouttier; A Truly Recursive Blind Equalization Algorithm; Thomson CSF Communications; 0-7803-4428; 1998 IEEE; pp. 3381-3384; Jun. 1998.

John B. Anderson et al; Digital Phase Modulation; various chapters with text that cover the topic of Minimum Shift Keying (MSK); New York; Plenum Press; 1986.

Ali H. Sayed; Fundamentals of Adaptive Filtering; Chapter 5; pp. 212-280; IEEE Press; New Jersey; John Wiley; 2003.

Nowlan, S.J. et al; A Soft Decision-Directed LMS Algorithm for Blind Equalization; IEEE Transactions on Communications; vol. 41, No. 2; Feb. 1, 1993; pp. 275-279; XP002713058; DOI: 10.1109/26.216497; Retrieved from the Internet: URL:http://ieeexplore.ieee.org/xpls/abs_all.jsp?arnumber=216497; [retrieved on Sep. 17, 2013].

Fatadin, I. et al; Blind Equalization and Carrier Phase Recovery in a 16-QAM Optical Coherent System; Journal of Lightwave Technology, IEEE Service Center, New York, NJ, US, vol. PP, No. 15; Aug. 1, 2009; pp. 3042-3049; XP011257084; ISSN: 0733-8724.

Siller, C.A. et al; Decision-Directed Fractionally Spaced Equalizer Control Using Time-Domain Interpolation; IEEE Transactions on Communications, IEEE Service Center, Piscataway, NJ, USA; vol. 39, No. 2; Feb. 1, 1991; pp. 182-186; XP000225300; ISSN: 0090-6778, DOI: 10.1109/26.76450.

Sayed, Ali H.; Fundamentals of Adaptive Filtering; IEEE; 2003 A John Wiley & Sons, Inc. Publication; Book Cover, copyright page, table of contents p. ix, Chapter 5, pp. 215-218; USA.

* cited by examiner

BLIND EQUALIZATION IN A SINGLE CARRIER WIDEBAND CHANNEL

STATEMENT OF GOVERNMENT RIGHTS

The Government of the United States of America has rights in this invention pursuant to Government Contract No. 09-C-4138.

SUMMARY

In one set of embodiments, there is provided a blind equalizer apparatus that includes a decision-directed least mean squares (LMS) blind equalizer.

In another set of embodiments, there is provided a blind equalizer apparatus that includes: a decision-directed LMS blind equalizer, wherein: the blind equalizer uses a finite impulse response filter with tap weights that are adaptively updated using a filter tap update algorithm, wherein blind equalization of one of an in-phase (I) channel and a quadrature (Q) channel is carried out by maximizing the Euclidean distance of binary modulated waveforms, wherein the blind equalizer averages a block to compute an independent phase estimate for a block, wherein the blind equalizer computes an error variable for a block from the phase estimate for the block, wherein the blind equalizer uses the phase estimate and alternating in-phase/quadrature (I/Q) one dimensional/binary slicing to make a hard decision, and wherein the blind equalizer uses the hard decision to derive an error variable that is used to update the filter tap weights.

In yet another set of embodiments, there is provided an equalizer apparatus that includes a decision-directed fractionally spaced equalizer (FSE) for equalizing a signal.

According to another set of embodiments, a method for blind equalization includes: providing a decision-directed LMS blind equalizer; using a finite impulse response filter, adaptively updating tap weights using a filter tap update algorithm; using the blind equalizer, equalizing one of anin-phase (I) channel and a quadrature (Q) channel by maximizing the Euclidean distance of binary modulated waveforms; using the blind equalizer, averaging a block to compute an independent phase estimate for a block; using the blind equalizer, computing an error variable for a block from the phase estimate for the block; using the blind equalizer, using the phase estimate and alternating I/Q one dimensional/binary slicing to make a hard decision; and using the blind equalizer, using the hard decision to derive an error variable that is used to update the filter tap weights.

According to still another set of embodiments, a method for blind equalization includes: detecting a phase offset using a decision-directed least mean squares (LMS) equalizer; and performing filter tap updating according to an LMS rule.

According to a yet further set of embodiments, a method for blind equalization includes: performing phase de-rotation using a decision-directed least mean squares (LMS) equalizer; and performing filter tap updating according to a least mean squares rule.

According to yet another set of embodiments, a method for blind equalization includes: detecting a phase offset using a decision-directed fractionally spaced equalizer; and performing filter tap updating according to a least mean squares rule.

According to yet a further set of embodiments, a method for blind equalization includes: performing phase de-rotation using a decision-directed fractionally spaced equalizer; and performing filter tap updating according to a least mean squares rule.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

DETAILED DESCRIPTION

Figure 1:
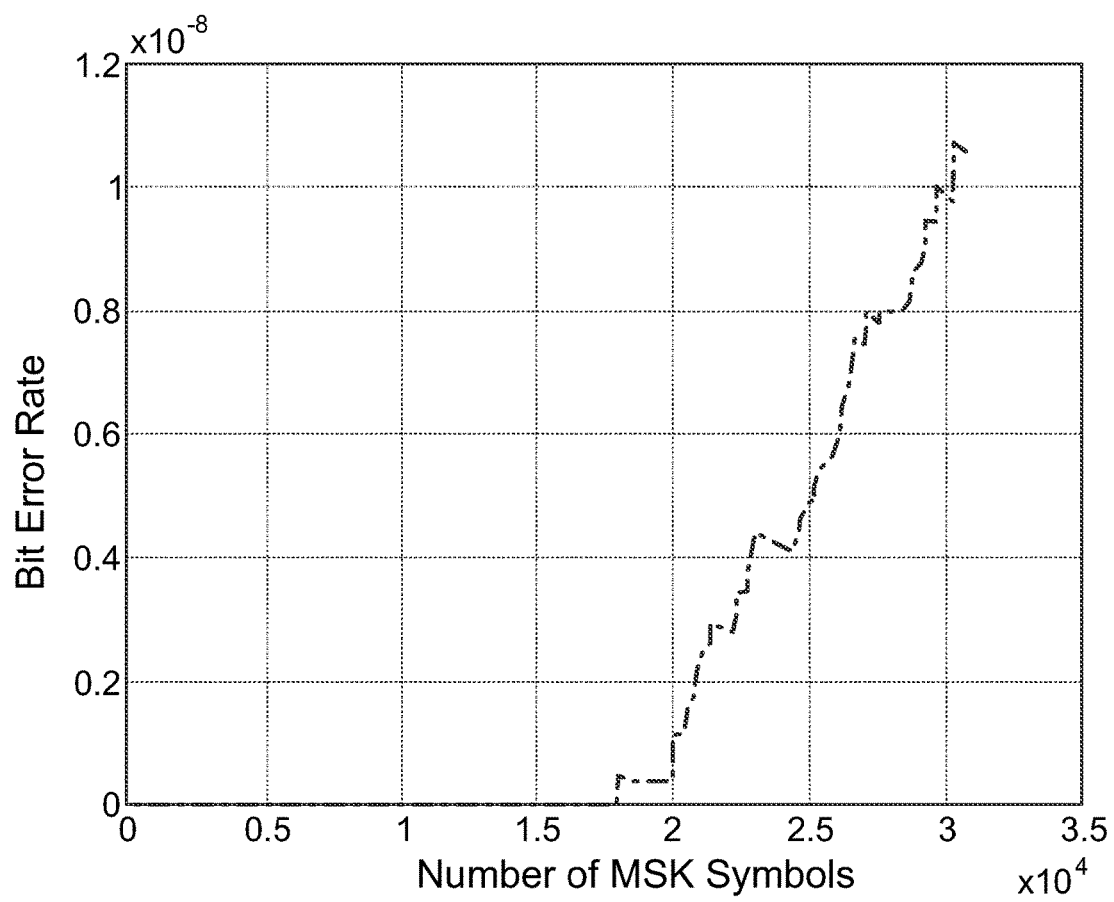
FIG. 1 is a graph of the bit error rate (BER) trajectory of the blind constant modulus algorithm (CMA) equalizer as a function of the number of MSK symbols.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The invention relates generally to blind equalization and more particularly to blind equalization of minimum shift keying signals and bandwidth-efficient modulation signals in a single carrier wideband channel.

Minimum-shift keying (MSK) is a type of continuous-phase frequency-shift keying that was developed in the late 1950s and 1960s. MSK encodes with bits alternating between quadrature components, with the quadrature (Q) channel component delayed by half the symbol period. MSK encodes each bit as a half sinusoid, resulting in a constant-modulus signal, which reduces problems caused by non-linear distortion.

Detection and blind equalization of MSK signals has long been studied in the literature, ever since the MSK modulation is introduced. The optimal receiver architecture for MSK signaling requires a matched filter with perfect knowledge of the channel state information (CSI). In practice, CSI either must be acquired, i.e. through training sequence or pilot signals, which decreases the spectral efficiency, or else must be assumed unknown at the receiver. Successful demodulation of MSK signals without CSI relies on blind equalization at the receiver.

Blind equalization is a digital signal processing technique in which the transmitted signal is inferred or equalized from the received signal, while making use only of the transmitted signal statistics without reference to the received signal, thus explaining the word "blind" in the name. The estimated equalizer is then convolved with the received signal to yield an estimate of the transmitted signal.

The recent development of space-based communication systems has given rise to an increasingly challenging problem—the lack of available frequency spectrum. One method that satellite system designers can use to maximize the use of available spectrum is bandwidth efficient modulation (BEM). This technique can enhance bandwidth efficiency while retaining reasonable power efficiency and implementation complexity.

Embodiments of the invention can also be applied to a fractional space equalizer (FSE). FSE's are adaptive equalizers whose taps are spaced closer than the reciprocal of twice the highest frequency component in the baseband signal $$\left(\text{i.e. } \frac{2}{F_s}\right).$$

FSE's provide superior performance compared to conventional symbol spaced equalizers and are able to compensate much more effectively for delay distortion relative to conventional synchronous symbol spaced equalizers.

MSK signals provide an efficient means to combat non-linear distortion while preserving spectral efficiency. Acquiring channel state information (CSI) costs both spectral efficiency and hardware complexity. Demodulation of MSK signals without CSI relies on blind equalization techniques.

As demonstrated by extensive computer simulation results, the proposed architecture allows an open loop, minimal hardware complexity and a very computationally efficient design that approaches the optimal performance possible for a blind equalizer applied to MSK signals and BEM signals.

According to embodiments of the invention, as the tap weights are adaptively updated, the tap weights do not substantially diverge from optimal tap weights.

Continuous phase modulation (CPM) is widely deployed in wireless communication systems because of its attractive spectral efficiency and power efficiency due to its property of having a constant envelope. As a special form of CPM, minimum shift keying (MSK) modulation became increasingly popular for bandwidth-limited and amplitude-limited channels. In particular, due to its constant-envelope property, MSK modulation greatly alleviates problems caused by non-linear distortion.

The optimal receiver architecture for MSK signaling requires matched filtering with perfect knowledge of the CSI. Acquiring CSI decreases spectral efficiency and increases hardware complexity. For example, CSI may be acquired through a training sequence or use of pilot signals, which decreases the spectral efficiency. Alternatively, CSI may be assumed unknown at the receiver. Successful demodulation of MSK signals without the CSI relies on blind detection/blind equalization at the receiver.

It has been shown that the performance of a blind detector converges to the performance of a zero-forcing (ZF) detector as the signal-to-noise ratio (SNR) increases. But it is an open question how well blind equalization functions in an environment with both channel distortion and additive white Gaussian noise (AWGN). Moreover, in such settings, the filter taps need to be re-computed for every round of blind equalization, which involves a very costly matrix inversion computation. Thus, according to past approaches, computational complexity grows exponentially with the input data length.

In an attempt to strike a more tractable compromise between computational complexity and performance, attempts have been made to apply a constant modulus algorithm (CMA) for blind equalization of MSK signals. Such blind equalizers with CMA minimize the dispersion of the square magnitude of the equalizer output about the constant γ. This approach suffers greatly from instability. It has been proven both analytically and experimentally that in the presence of AWGN, blind constant modulus (CM) receivers diverge from optimal tap weights over time. FIG. 1 is a graph of the bit error rate (BER) trajectory of the blind CMA equalizer as a function of the number of MSK symbols. As can be seen from FIG. 1, the optimal filter tap weights start diverging after approximately 17,000 MSK symbols.

MSK modulation can, according to embodiments of the invention, be addressed as a staggered binary modulation with in-phase channels or I channels being orthogonal to quadrature channels or Q channels. This approach guides a design for a blind equalization architecture according to embodiments of the invention.

Figure 2:
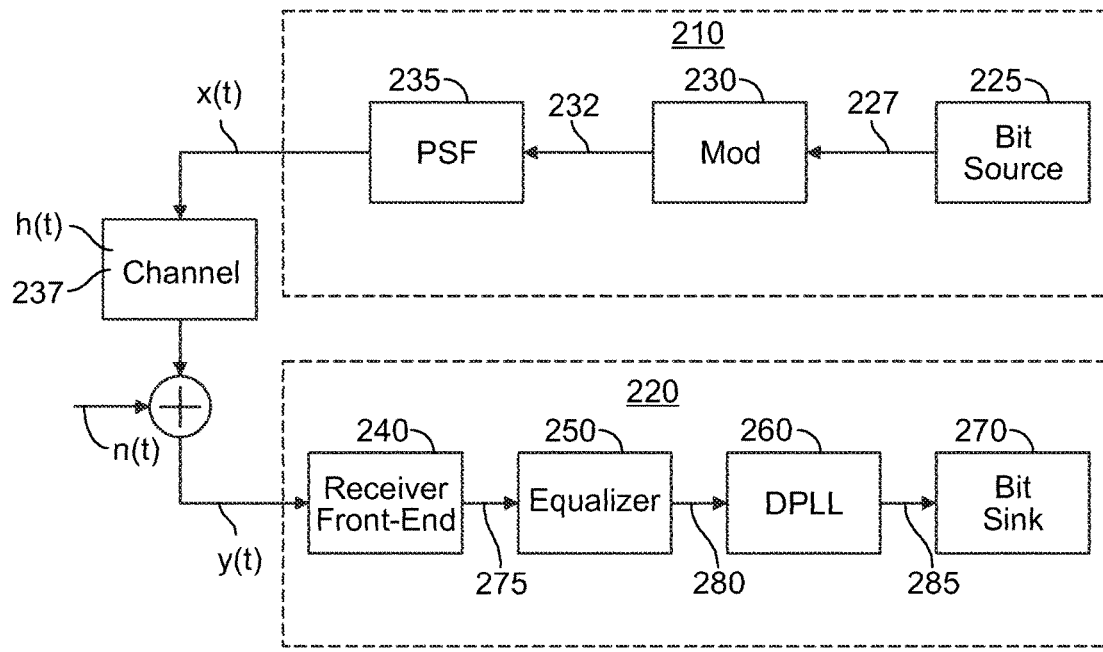
FIG. 2 is a drawing of components of an end-to-end communication system for MSK signals including a blind equalizer.

FIG. 2 is a drawing of components of an end-to-end communication system 200 for MSK signals including a blind equalizer. The communication system 200 comprises a transmitter system 210 and a receiver system 220. The transmitter system 210 generates the outgoing signal x(t) and comprises a bit source 225, a modulator 230, and a pulse shaping filter (PSF) 235. The bit source 225 produces an information bit b 227 that is sent to the modulator 230. The modulator maps the information bit b 227 into a symbol in the Cartesian coordinate system, generating a modulated output symbol sequence m 232 that is sent to the PSF 235. PSF's are generally utilized by communication systems to provide one or more spectral masks in order that signals are well behaved and in order to limit one or more signals to their respective allotted spectra with substantially no spillover into neighboring spectral bands. PSF's provide spectral containment.

The PSF 235 is configured to operate in a very crowded spectrum, assigning the functions of interest their own individual spectral band in the frequency domain. The PSF

235 preferably assigns to a function of interest a bandwidth and a frequency center point τ. For example, the PSF 235 may assign to a frequency of interest the bandwidth extending from approximately 995 MHz to 1.05 GHz, with a frequency center point τ=1.00 GHz. The PSF 235 generates the outgoing analog time-domain signal x(t) 215.

The input signal x(t) undergoes distortion h(t) due to channel-generated convolution effects generated by the channel 237 before being output from the channel 237. Noise n(t) is also added to the signal, generating a received analog time-domain signal y(t). The noise n(t) comprises AWGN. AWGN may arise from one or more causes including the heating up of the receiver system 220 and other causes of power dissipation. The noise n(t) is linear and is not dependent on x(t).

The receiver system 220 receives the received signal y(t) and comprises a receiver front-end processing block 240, an equalizer 250, a DPLL 260, and a bit sink 270. The receiver front-end processing block 240 receives the received signal y(t). In order to produce all the sufficient statistics needed to demodulate MSK signals prior to equalizer, the receiver front-end processing block 240 is configured to perform one of more of the following algorithms: automatic gain control (AGC), analog to digital converter (ADC), timing recovery (TR) and down sampler (DS). These functions help ensure that the received signal is optimally synchronized and down sampled.

Sampling of the received analog signal y(t) is carried out in the analog domain using a small sampling interval $T_s$ and a corresponding sampling frequency $$\frac{1}{T_s}.$$

For example, a representative sampling frequency $$\frac{1}{T_s}$$

is approximately 20 Ghz, which corresponds to a sampling interval of approximately 0.05 nanoseconds.

A digitized sequence of samples y(n) 275 is thereby generated from the received analog signal y(t). The sequence of samples y(n) is an approximate mathematical description of how y(n) is generated from x(t) through channel convolution h(t) and noise generation n(t). Accordingly, according to embodiments of the invention, $y(n) = y(nT_s)$ is the $n^{th}$ element of $y \in C^{N \times 1}$. According to embodiments of the invention, the sampling rate approximately coincides with the symbol rate $$\frac{1}{T_s}.$$

For embodiments employing an FSE instead of a symbol-based MSK blind equalizer, since there would be more than one sample per symbol, the sample $$y(n) \equiv y\left(n\frac{T_s}{M}\right),$$

where m is the oversampling factor and M>1. According to these sets of embodiments, the sample y(n) is still the $n^{th}$ element of the received $y \in C^{N \times 1}$ with length N, but the definition of each element is different in that the sampling time interval is smaller.

Embodiments of the invention can also be applied to a fractionally spaced equalizer (FSE). More specifically, for a FSE, the tap spacing of the equalizer is a fraction of the baud spacing (i.e. in time) or of the transmitted symbol period (i.e. $T_s$). For convenience of representation, the combined effect of the channel and the impulse response of the pulse shaping filter in continuous time can be represented by $\tilde{h}(t)$. The continuous time noise can be represented as n(t). If m(n) is the transmitted discrete symbol sequence with symbol period $T_s$ (i.e. the sampling rate is $$F_s = \frac{1}{T_s}),$$

the baseband equivalent of the analog received signal y(t) can be expressed as:

$$y = \sum_{n=-\infty}^{\infty} m(n)\tilde{h}(t-nT-t_0) + n(t) \qquad (1)$$

The fractionally spaced equalizer (FSE) is an FIR filter with tap spacing of this filter is $$\frac{T_s}{M},$$

where M is an oversampling factor (M>1). As the sample period (i.e. the rate) of the input sequence is the same as the tap spacing of the filter, the input sequence to the FSE y(t), needs to be sampled at intervals that are separated by a time interval $$\frac{T_s}{M}.$$

The discrete time-equivalent signal $$y\left(k\frac{T_s}{M}\right)$$

is given by:

$$y\left(k\frac{T_s}{M}\right) = \sum_{n=-\infty}^{\infty} m(n)\tilde{h}\left(k\frac{T_s}{M} - nT - t_0\right) + n\left(k\frac{T_s}{M}\right), \qquad (2)$$

where k is an integer and $T_s$ is the symbol period of the input signal m(n). The time index k will be used to represent the samples in fractional space and the index n will be used to represent the samples in baud space (i.e. at the sampling rate:

$$F_s = \frac{1}{T_s}).$$

In fractional space, the output m(k) of the equalizer is given by:

$$m(k) = \sum_{i=0}^{MN-1} f(i) y\left((k-i)\frac{T_s}{M}\right), \quad (3)$$

where f(i) are the equalizer taps and the tap spacing of the FSE is $$\frac{T_s}{M}.$$

The length of the FSE is MN. As we need only one output symbol corresponding to one input symbol m(n), it is enough to calculate m(k) once every M samples. An alternative method for making the output rate of the FSE the same as the baud rate (i.e. sampling rate:

$$F_s = \frac{1}{T_s})$$

is to downsample m(k) by a factor of M.

The receiver front-end processing block generates a processed signal y(n) 275 that is transmitted to the equalizer 250. The equalizer receives the processed signal y(n) 275 and equalizes the processed signal y(n) 275 by undoing the channel distortion according to embodiments of the invention, transmitting to the digital phase-locked loop (DPLL) 260 an equalizer output q 280. The DPLL 260 receives the equalizer output q 280, tracks and estimates a carrier frequency offset (CFO), and generates DPLL output m 285. DPLL output m 285 represents the best available estimate of the information bit b 227 given the signal-to-noise ratio (SNR). The CFO is the rate of change of the phase offset $\theta_0$.

The purpose of the receiver is to recover the information bits b 227, which are corrupted by channel distortion, carrier frequency offset (CFO) and additive noise.

The received signal y(t) is linearly dependent on the transmitted signal x(t) but is corrupted by channel distortion, CFO and AWGN. The function of the equalizer 250 is to undo or reverse the channel distortion and other corruption that has been applied to the received signal y(t).

We let $m(n) \in \{-1, +1\}$ be the $n^{th}$ element of $m \in \mathbb{R}^{N \times 1}$, which represents the information symbol sequence. We also assume that $\forall n$, m(n) is equally likely to be ±1 and we further assume that m are independently and identically distributed random variables (IID). The complex baseband information-bearing MSK signal x(t) can be written as:

$$x(t) = e^{j\phi(t)}, \quad (4)$$

where the phase $\phi(t)$ is given by $$\phi(t) = \frac{\pi}{2} \sum_n m(n) \psi(t - nT_s) \quad (5)$$

with $T_s$ denotes the symbol period and $$\psi(t) = \begin{cases} 0, & t < 0 \\ \int_0^t p(s)ds, & 0 \le t \le T_s \\ 1, & t \ge T_s \end{cases} \quad (6)$$

Equation (4) describes the dependence of y(t) on x(t), h(t), and n(t). In equation (6), p(t) denotes the pulse shaping filter with support in the interval of [0, $T_s$]. It is worth while to note that, x(t) in equation (4) can be rewritten for each $nT_s \le t \le (n+1)T_s$ as follows:

$$x(t) = e^{j\frac{\pi}{2}(\sum_{k=1}^{n-1} m(k) + m(n)\psi(t - nT_s))}.$$

Thus, the phase variation induced by one symbol is equal to $$\frac{\pi}{2}.$$

At the receiver side, the received waveform y(t) is linearly dependent on x(t), with a carrier frequency offset. The received waveform y(t) is typically corrupted by AWGN noise n(t). That is, $$y(t) = \int_{-\infty}^{+\infty} e^{j(2\pi f_0 t + \theta_0)} x(\tau) h(t - \tau) d\tau + n(t), \quad (7)$$

where $f_0$ represents the carrier frequency offset in Hz, the initial phase offset $\theta_0 \in [0, 2\pi]$ and the noise power spectral density of the noise process n(t) is No. The initial phase offset $\theta_0$ does not depend on time. Furthermore, h(t) denotes the channel impulse response, which presents either a linear distortion channel (i.e. conventional multipath channel) or non-linear distortional channel.

Figure 3:
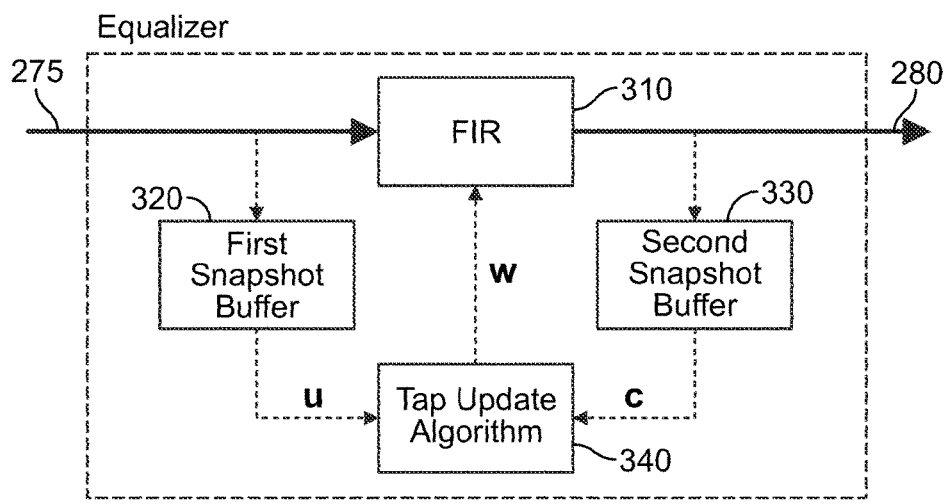
FIG. 3 is a drawing of the architecture of a blind equalizer.

FIG. 3 is a drawing of the architecture of a blind equalizer 250. The blind equalizer 250 outputs an output signal q(n) 280 of length L using a finite impulse response (FIR) filter 310 with tap weights: $w = [w(1), w(2), \ldots, w(L)]^T$ can be expressed as:

$$q(n) = \sum_l w(l) y(n - 1). \quad (8)$$

For embodiments employing an FSE instead of an MSK blind equalizer, the FIR filter outputs q(n) are not separated by a time interval $T_s$, but rather by a time interval $$\frac{T_s}{M}.$$

The FIR filter 310 uses tap weights w that can be adaptively updated via the filter tap update algorithm 340. A first snapshot buffer 320 subsamples y and the second snapshot buffer subsamples the equalizer output 280. If the channel is changing slowly (for example, changes on the order of Hz to tens of Hz) but data is arriving at a much faster data rate (for example, on the order of Mhz to Ghz), it is not necessary to update the FIR 310 based on the data rate. Instead, according to embodiments of the invention, updates can be carried out by the tap update algorithm 340 at a rate consistent with the rate of change of the channel. The first snapshot buffer 320 and the second snapshot buffer 330 allow the filter tap update algorithm to operate at the much lower rate.

The adaptive FIR filter 310 only needs to track the rate of change of the channel distortion rather than the data rate of the received signal y(t). As depicted in FIG. 3, the major signal path, the thick line from processed signal y(n) 275 through the FIR 310 and then through equalizer output q 280, is a path with a data rate that is potentially significantly faster. On the other hand, the two minor signal paths—which typically have a significantly slower data rate and are indicated by dashed lines—diverge from the major signal path onto a thin line that passes through either the first snapshot buffer 320 or the second snapshot buffer 330, then through the filter tap update algorithm 340, and then is directed back to the adaptive FIR filter 310 before rejoining the major signal path.

The MSK symbol constellation is updated at the output q 280 of the equalizer 250 using the updated filter tap weights.

The crucial observation that tracking the rate of change of the channel distortion is sufficient provides the opportunity for updating the tap weights w at a much lower rate without compromising performance. If it were necessary to track the data rate of the received signal y(t), it would not be possible to update the tap weights w at the significantly lower rate without performance being compromised.

Let K be the size of the second SS Buffer, then $c \in C^{K \times 1}$ is defined as:

$$c=[q(n)q(n-1) \ldots q(n-K+1)]^T,$$

where c is the symbol output by the equalizer and stored in the second SS Buffer and the first SS buffer$_1$ can be similarly defined as:

$$u=[y(n)y(n-1) \ldots y(n-K-L+2)]^T,$$

where u is the sample stored in the first SS buffer 320 and y 275 is the digitized version y(n) 275 of the received analog signal after being output by the PSF 235 and then undergoing channel convolution h(t) and noise generation n(t), with $u \in C^{(K+L-1) \times 1}$. The filter tap update algorithm 340 then computes the updated w with the knowledge of u and c.

For embodiments employing an FSE instead of a symbol-based MSK blind equalizer, the FIR 310 output observation vector c collects samples at times separated by the symbol interval $T_s$. For FSE embodiments, the FIR 310 observation vector c may be determined using the following equation:

$$c=[q(n)q(n-M)q(n-2M) \ldots q(n-(K-1)M)]^T.$$

The FIR 310 output observation vector c has length K, as in the embodiments using an MSK blind equalizer. The balance of the mathematical analysis is similar for both MSK and FSE embodiments of the invention.

Upon observing the regression vector u, the constant modulus algorithm (CMA) forms the $k^{th}$ length L regression row vector from subset of u as:

$$u_k=[y(n-k) \ldots y(n-k-L+1)], \quad (9)$$

where $\forall k=0, 1, \ldots, K-1$. The optimal filter weight w in constant modulus (CM) sense can be found by solving:

$$\min_w E(\gamma - |u_k w|)^2. \quad (10)$$

It is well known that (10) can be approximated iteratively via the following recursion:

$$w_k = w_{k-1} + \mu u_k^* \left[ \gamma \frac{z_k}{|z_k|} - z_k \right], \quad (11)$$

$$z_k = u_k w_{k-1}.$$

where μ is a positive step-size (usually small) and (•)' denotes complex conjugate. The initial value of $w_{-1}$ can be obtained by a common central tap initialization or some other pre-known filter tap weights. Often in practice the recursion in (11) is implemented in normalized form as:

$$w_k = w_{k-1} + \frac{\mu u_k^*}{\|u_k\|^2} \left[ \gamma \frac{z_k}{|z_k|} - z_k \right], \quad (12)$$

$$z_k = u_k w_{k-1}.$$

The FIR equalizer is then adaptively updated with the new filter weights $w_k$. The output of the FIR fitter q(n) with a possible carrier frequency offset is then passed into a digital phase-locked loop (DPLL).

According to embodiments of the invention, a simple blind equalizer comprises a decision-directed (DD) least mean squares (LMS) equalizer.

Embodiments of the invention comprise a blind equalizer that equalizes minimum shift keying (MSK) signals in a single carrier channel.

According to embodiments of the invention, a method for blind equalization comprises detecting a phase offset $\theta_0$ using a DD LMS equalizer, performing phase de-rotation using the DD LMS equalizer, and performing filter tap updating according to a LMS rule.

The phase detector estimates the inherent phase offset $\theta_0$ of c. According to embodiments of the invention, where the received signal y is rotated by the phase offset $\theta_0$ and a carrier frequency offset $f_0$, to find the phase offset $\theta_0$ of c, the sufficient statistic T may be computed according to the following equation:

$$T = \frac{1}{2} \sum_{k=0}^{\frac{K}{2}-1} c(2k+1)^2 + ((-j) \cdot c(2k+2)^2, \quad (13)$$

where c(k) denotes the $k^{th}$ element within the vector c. The phase offset $\theta_0$ can then be estimated from T in (13) according to:

$$\theta_0 = \arctan(T). \quad (14)$$

The FIR filter output symbol sequence c may then be de-rotated by the $\theta_0$. The de-rotated symbol sequence for the sampled baseband MSK signal d can be formed by performing:

$$d=e^{-j\theta_0}c \quad (15)$$

Careful examination of the de-rotated symbol sequence reveals the fact that, according to embodiments of the invention, the sampled baseband MSK signal d alternates between real and imaginary values for successive elements. That is:

$$\Im\{d(k)\}=0, \forall k \in \text{odd},$$

$$\Re\{d(k)\}=0, \forall k \in \text{even}.$$

Due to the inherent modulation property of MSK, the phase increases or decreases by $$\frac{\pi}{2}$$

for each successive symbol. Accordingly, after de-rotation, the sampled baseband MSK signal d alternates between real and imaginary values.

With the knowledge of both u and d, the FIR filter taps may be updated according to the LMS algorithm. The optimal filter tap weights in the least mean squares (LMS) sense can be found by solving the following optimization problem:

$$\min_{w} E|d(k) - u_k w|^2, \quad (16)$$

where $u_k$ is the regression data as defined in (9). By taking into the account of structure property of d, the optimal solution for (16) can be found iteratively:

$$w_k = w_{k-1} + \mu u_k^* [\hat{d}(k) - \Re\{u_k w_{k-1}\}], \forall k \in \text{odd}, \quad (17)$$

$$w_k = w_{k-1} + \mu u_k^* [\hat{d}(k) - \Im\{u_k w_{k-1}\}], \forall k \in \text{even}, \quad (18)$$

where $\mu$ is a (usually small) constant, and $\hat{d}(k)$ is the decision. The decision $\hat{d}(k)$ may be determined according to the following equations, which must be used together:

$$\hat{d}(k) \gtrless_{\hat{d}(k)=-1}^{\hat{d}(k)=1} 0, \forall k \in \text{odd},$$

$$\hat{d}(k) \gtrless_{\hat{d}(k)=-j}^{\hat{d}(k)=j} 0, \forall k \in \text{even},$$

where $\mu$ is a constant and $u_k$ is a regression vector.

The equations for d(k) facilitate the hard decision. The estimated symbol value $\hat{d}(k)=1$ if the observed value of d(k) is greater than zero. The estimated symbol value $\hat{d}(k)=-1$ if the observed value of d(k) is less than zero.

Alternatively, the optimal solution for (16) can be found iteratively using an alternative set of normalized equations:

$$w_k = w_{k-1} + \frac{\mu}{\epsilon + \|u_k\|^2} u_k^* [\hat{d}(k) - \Re\{u_k w_{k-1}\}], \forall_k \in \text{odd}, \quad (19)$$

$$w_k = w_{k-1} + \frac{\mu}{\epsilon + \|u_k\|^2} u_k^* [\hat{d}(k) - \Im\{u_k w_{k-1}\}], \forall_k \in \text{even}, \quad (20)$$

where $\mu$ is a (usually small) constant, $\epsilon$ is a small positive tethering parameter, $u_k$ is a regression vector, and $\hat{d}(k)$ is the decision.

The tethering parameter $\epsilon$ can be tuned to the application at hand for optimal convergence, thereby providing another degree of freedom.

Moreover, as can be seen from (19) and (20), the normalized decision-directed LMS employs a time-variant step-size of the form $$\mu_k = \frac{\mu}{\epsilon + \|u_k\|^2},$$

as opposed to the constant step-size $\mu$ deployed in (17) and (18). The time-variant step-size allows the DD LMS algorithm a much faster convergence, since the size of the change to $w_{k-1}$ will therefore be in proportion to the norm of regression data $u_k$. Accordingly, the equalizer converges to the optimal tap weights in an LMS sense and also locks into the optimal tap weights as time progresses.

The blind equalization algorithm uses a finite impulse response filter with tap weights that are adaptively updated using a filter tap update algorithm. Two snapshot buffers are introduced according to embodiments of the invention, allowing the filter tap update algorithm to operate at a much lower rate than would otherwise be possible without compromising performance.

This section provides computer simulation results to show performance of the proposed blind decision directed (DD) LMS equalizer for MSK signals. The number of FIR filter taps L=41, which provides good performance while maintaining affordable complexity. The size of snapshot (SS) buffer$_2$ is K=128, the constant step-size $\mu=1.0\times10^{-4}$ and $\epsilon=1.0\times10^{-4}$ for the DD LMS equalizer.

Figure 4:
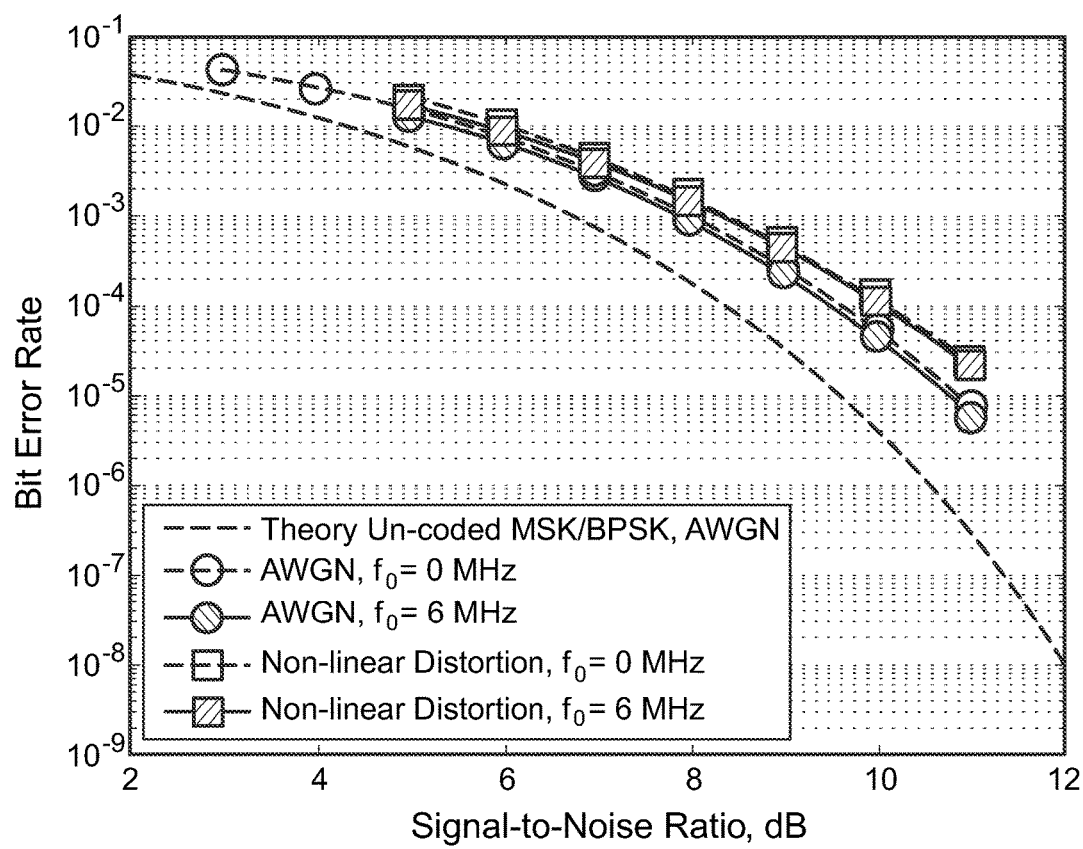
FIG. 4 is a graph of the bit error rate (BER) as a function of the signal-to-noise ratio (SNR) for a DD LMS blind equalizer in cases of distortion predominantly caused by AWGN and in cases of predominant non-linear distortion, for different carrier frequency offsets $f_0$.

FIG. 4 is a graph of the bit error rate (BER) as a function of the signal-to-noise ratio (SNR) $E_b/N_0$ for a DD LMS blind equalizer in cases of distortion predominantly caused by AWGN and in cases of predominantly non-linear distortion, for different carrier frequency offsets $f_0$. FIG. 4 also includes the theoretical BER for uncoded MSK or BPSK in the presence of AWGN. For a channel with distortion predominantly caused by AWGN, embodiments of the invention using the DD LMS blind equalizer produce results that are only approximately ≈1.0 dB away from the theoretical MSK/BPSK limit even for a carrier frequency offset $f_0$ as high as 6 MHz. On the other hand, for cases in which the channel has predominantly non-linear distortion, the blind DD LMS equalizer performs within ≈2.0 dB away from theoretical limit even with carrier frequency offset up to $f_0$=6.0 MHz.

Figure 5B:
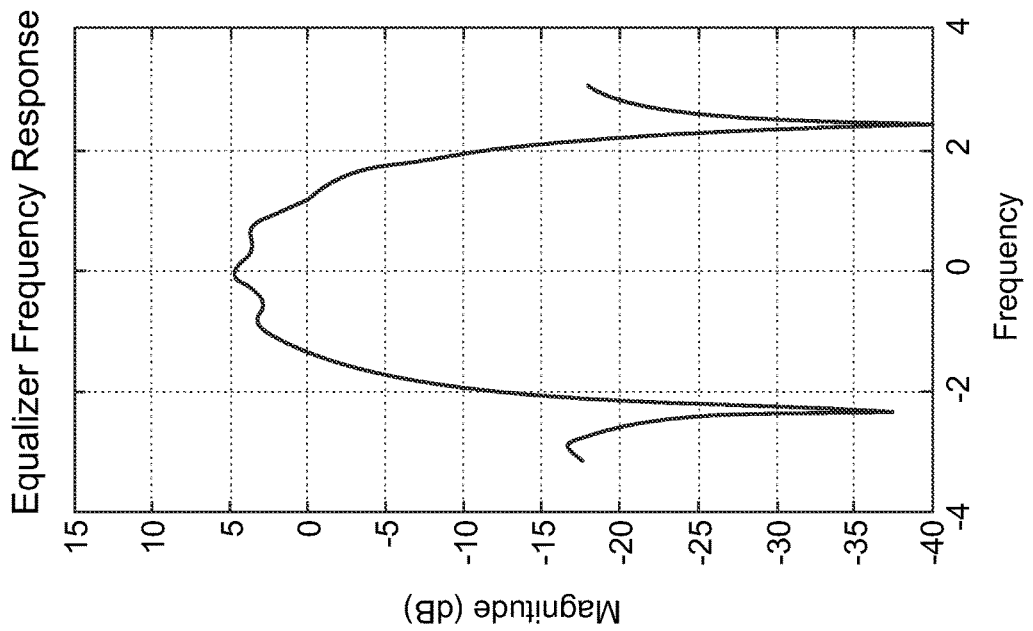
FIG. 5B is a graph of the magnitude of the equalizer response as a function of frequency for a DD LMS equalizer in the presence of AWGN.
Figure 5A:
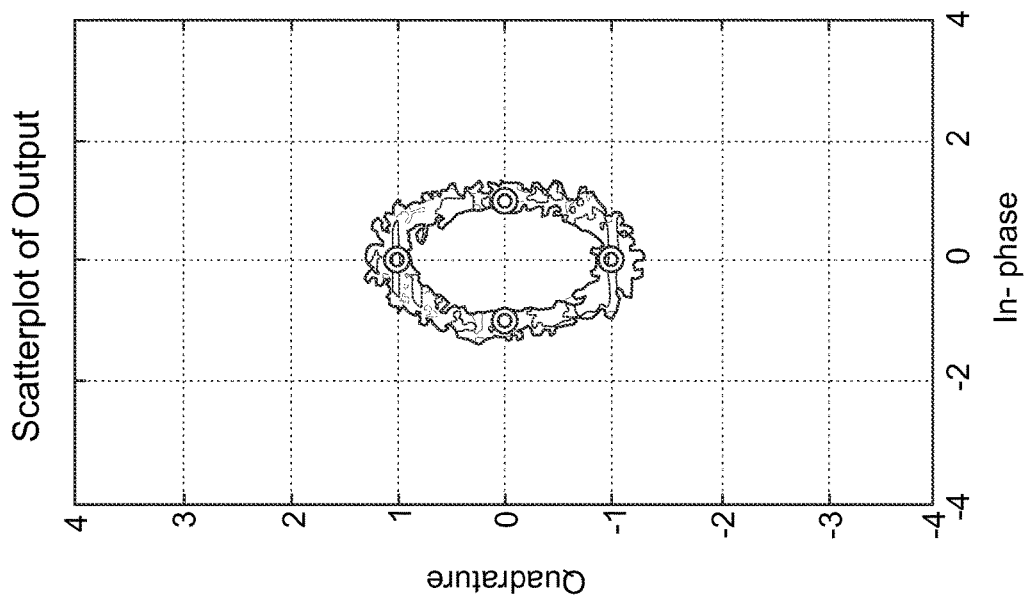
FIG. 5A is a scatterplot of relative quadrature and in-phase output for a DD LMS equalizer in the presence of additive white Gaussian noise (AWGN).

FIG. 5A is a scatterplot of relative quadrature and in-phase output c for a DD LMS equalizer in the presence of AWGN. In this example, the frequency offset $f_0$=6 MHz. FIG. 5A clearly indicates the effect of a non-zero carrier frequency offset $f_0$, which produces a ring-like constellation. Because frequency is the derivative of the phase, the product of the frequency offset $f_0$ and time (as seen in the exponent of the first term to the right of the integral in equation (7)) will change over time, producing the ring-like constellation. At this point, prior to further processing, the signals at the output of the equalizer are not ready for the bit decision device since there is CFO still embedded in the signal.

Accordingly, the estimated minimum shift keying symbol constellation at the output allows the bit sink to minimize errors in the transmitted information sequence.

Accordingly, the architecture allows an open loop, minimal hardware complexity and a very computationally efficient design that approaches optimal performance for this blind equalizer design for MSK signals.

FIG. 5A depicts the constellation of the signal q at the output of the equalizer for the same example from FIG. 4 in which the carrier frequency offset $f_0$=6 Mhz. It is assumed that channel distortion has been properly equalized, and accordingly the only distortion left in the signal is the CFO. Accordingly, the signal keeps spinning at the rate of $f_0$=6 MHz.

FIG. 5B is a graph of the magnitude of the equalizer response as a function of frequency for a DD LMS equalizer in the presence of AWGN. In this example, $f_0$=6 MHz.

The frequency response of any equalizer can be thought of as the "signature" of the equalizer in response to the channel distortion.

While the numerical experiment began after 1 MSK symbol was generated, the data presented in FIGS. 5A-5B was recorded after $5.11\times10^8$ MSK symbols. Due to the decision-directed nature of the equalizer architecture, the frequency response of the blind DD LMS equalizer maintains the optimal filter tap weights. Even with a significant CFO of 6 MHz, the optimal filter tap weights do not change over time, in contrast to an equalizer employing CMA, which, as shown in FIG. 1, starts to deviate from the optimal filter taps around ~17000 MSK symbols.

Figures 6A, 6B:
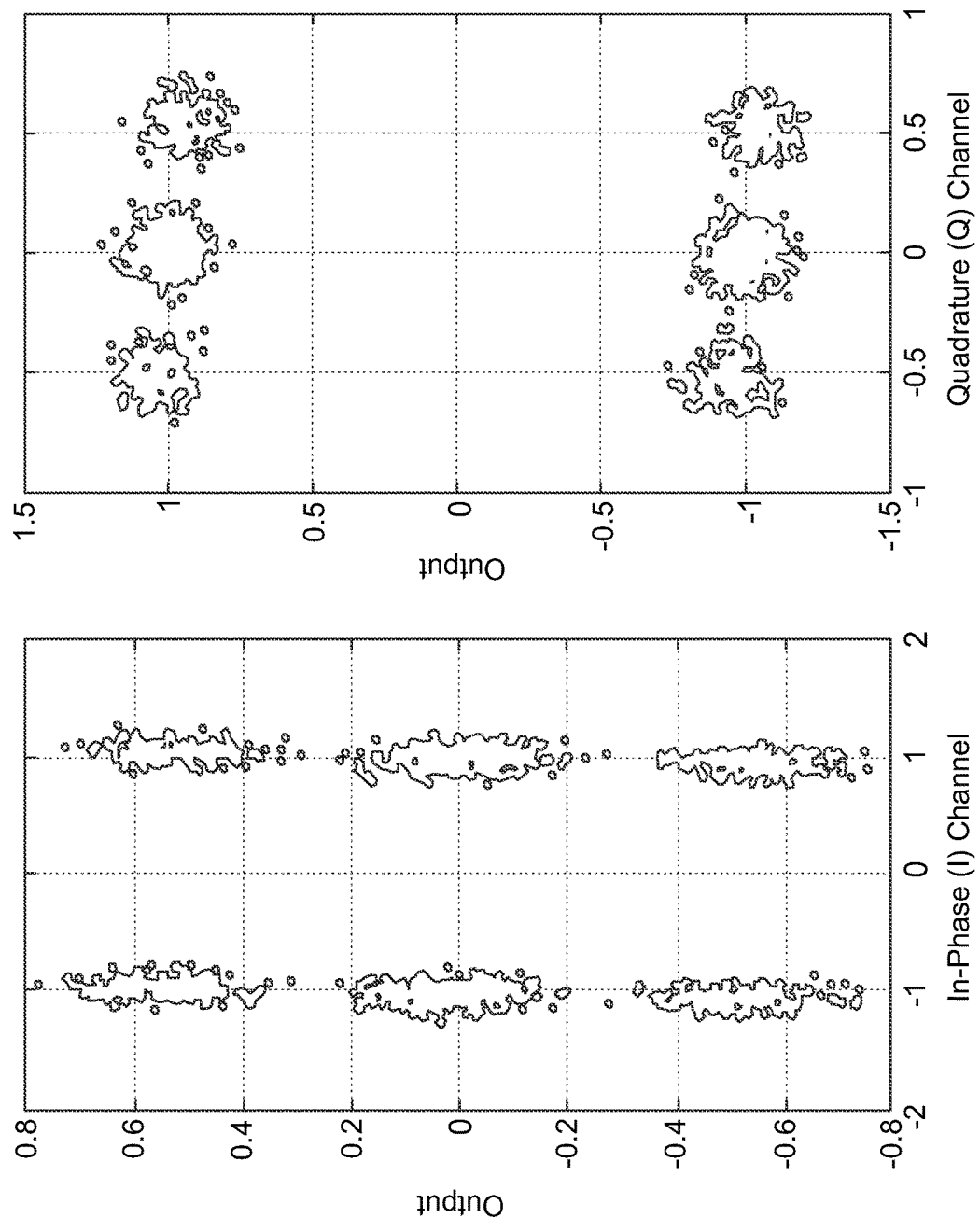
FIG. 6A is a scatterplot for the in-phase (I) channel of the output of a digital phase-locked loop (DPLL) in the presence of AWGN with $f_0=6$ MHz.
FIG. 6B is a scatterplot for the quadrature (Q) channel of the output of a digital phase-locked loop (DPLL) in the presence of AWGN with $f_0=6$ MHz.

FIG. 6A shows a scatterplot for the in-phase (I) channel of the output of a digital phase-locked loop (DPLL) in the presence of AWGN with $f_0$=6 MHz.

FIG. 6B is a scatterplot for the quadrature (Q) channel of the output of a digital phase-locked loop (DPLL) in the presence of AWGN with $f_0$=6 MHz.

In contrast to FIG. 1, in which the blind CM equalizer filter taps diverge at approximately 17,000 MSK symbols, the blind DD LMS equalizer does not substantially diverge from optimal tap weights, maintaining the MSK symbol constellation after a long duration of $5.11 \times 10^8$ MSK symbols.

The constellations shown in FIGS. 6A and 6B re-affirm that the underlying MSK signal has information embedded in the in-phase (I) dimension for the odd symbols and has information embedded in the quadrature (Q) dimension for the even symbols. The DPLL efficiently tracks the carrier frequency offset: $f_0$ and the random phase offset $\theta_0$ to produce a MSK constellation (FIGS. 6A and 6B) separated into in-phase (I) and quadrature (Q) components.

Thus, the signal at the output of the DPLL is now ready to send to the decision device to make the bit decision.

According to embodiments of the invention, the decision-directed (DD) least mean squares (LMS) blind equalizer averages a block to make an independent phase estimate for each block. This procedure permits the algorithm to operate without the need for phase lock and/or frequency lock.

If the signaling format changes so that it is no longer MSK, the invention still works. According to embodiments of the invention, the disclosed blind DD LMS equalizer can also equalize non-staggered, non-MSK signals such as bandwidth-efficient modulation (BEM) signals in a single carrier channel. For example, according to embodiments of the invention, the blind DD LMS equalizer can equalize in a single carrier channel signals such as regular QPSK, phase-shift keying (PSK), amplitude and phase-shift keying (APSK) and quadrature amplitude modulation (QAM) signaling formats. According to the BEM embodiments, the architecture in which successive values of the sampled baseband MSK signal d alternate between real and imaginary is not required.

For example, according to embodiments of the invention, the disclosed DD LMS equalizer can equalize in a single carrier channel signals such as 8-PSK, 16-APSK, 16APSK/16QAM, and 64APSK/64QAM signaling formats.

According to embodiments of the invention, the in-phase (I) channels and quadrature (Q) channels of MSK modulation can be equalized independently. According to embodiments of the invention, blind equalization of one of anin-phase (I) channel and a quadrature (Q) channel may be carried out by maximizing the Euclidean distance of binary modulated waveforms.

According to embodiments of the invention, the DD LMS blind equalizer uses the phase estimate and alternating I/Q one dimensional/binary slicing to generate a hard decision. The hard decision is then used, according to embodiments of the invention, to derive a error variable to feed into the LMS update algorithm.

According to embodiments of the invention, the error variable is computed from the phase estimate and alternating I/Q one dimensional/binary slicing for hard decision.

The prior art requires the signals to achieve phase lock and/or frequency lock before they can be applied to start the blind equalization process. According to embodiments of the invention, the blind equalization process can be initiated without the requirement of a prior phase lock and/or frequency lock. Also, the DD LMS blind equalization algorithm can be applied to non-staggered modulation, where the prior art addresses blind equalization to staggered modulation (i.e. MSK, CPM signaling).

Relative to the prior art, embodiments of the invention generate and update the blind equalizer filter tap coefficient/weights much more effectively and with much greater computational efficiency. Adaptive updating is achieved, according to embodiments of the invention, by the DD LMS algorithm.

Embodiments of the invention converge to optimal filter tap weights over time. Moreover, embodiments of the invention lock in the optimal tap weights as time progresses. Moreover, embodiments of the current invention require only a phase estimate, which can be determined without the need for a phase lock and/or a frequency lock.

Figure 7:
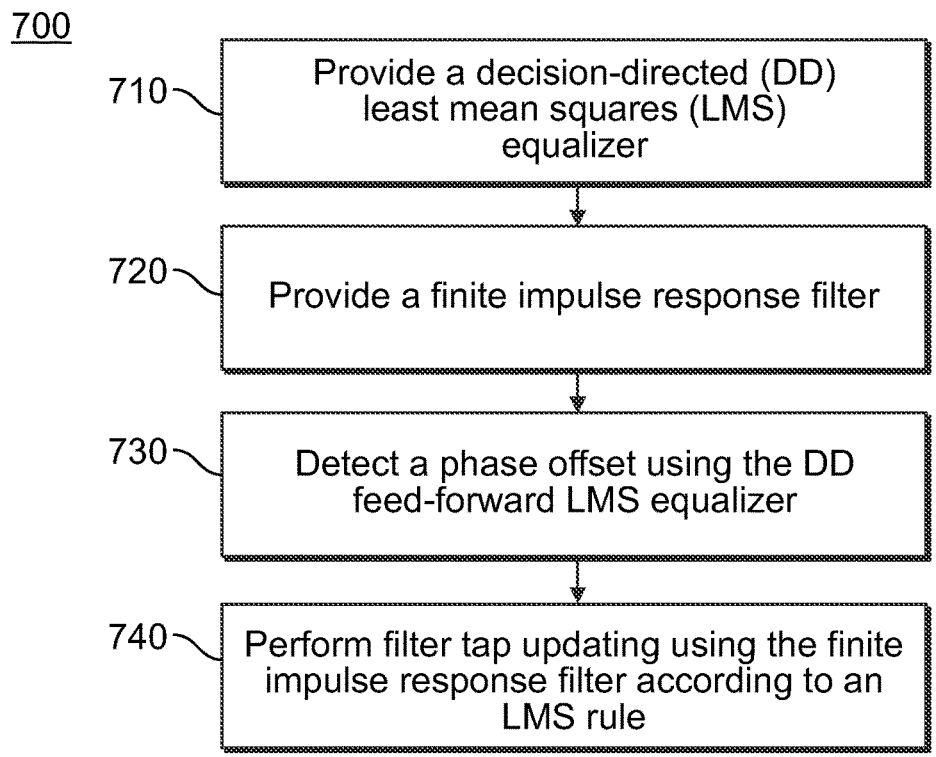
FIG. 7 is a flowchart of a method for blind equalization using a decision-directed least mean squares equalizer and phase offset detection.

FIG. 7 is a flowchart of a method 700 for blind equalization using a decision-directed least mean squares equalizer and phase offset detection. The order of the steps in the method 700 is not constrained to that shown in FIG. 7 or described in the following discussion. Several of the steps could occur in a different order without affecting the final result.

In block 710, a decision-directed (DD) least mean squares (LMS) equalizer is provided.

In block 720, a finite impulse response filter is provided.

In block 730, a phase offset is detected using the DD LMS equalizer.

In block 740, filter tap updating is performed using the finite impulse response filter according to an LMS rule. Block 740 then terminates the process.

Figure 8:
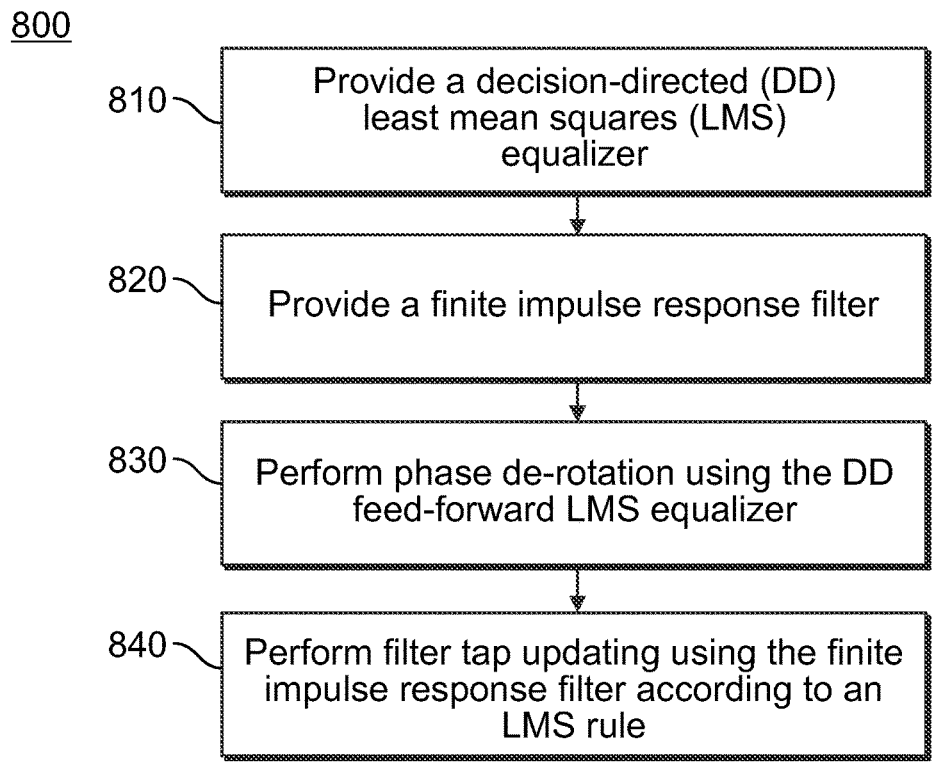
FIG. 8 is a flowchart of a method for blind equalization using a decision-directed least mean squares equalizer and phase de-rotation.

FIG. 8 is a flowchart of a method 800 for blind equalization using a decision-directed least mean squares equalizer and phase de-rotation. The order of the steps in the method 800 is not constrained to that shown in FIG. 8 or described in the following discussion. Several of the steps could occur in a different order without affecting the final result.

In block 810, a decision-directed (DD) least mean squares (LMS) equalizer is provided.

In block 820, a finite impulse response filter is provided.

In block 830, phase de-rotation is performed using the DD LMS equalizer.

In block 840, filter tap updating is performed using the finite impulse response filter according to an LMS rule. Block 840 then terminates the process.

Figure 9:
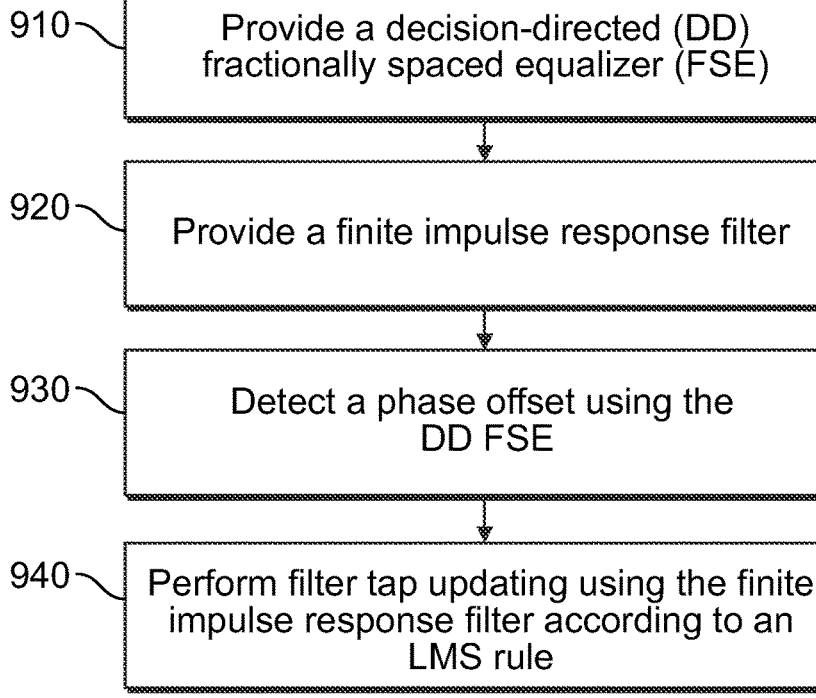
FIG. 9 is a flowchart of a method 900 blind equalization using a decision-directed fractionally spaced equalizer and phase offset detection.

FIG. 9 is a flowchart of a method 900 for blind equalization using a decision-directed fractionally spaced equalizer and phase offset detection. The order of the steps in the method 900 is not constrained to that shown in FIG. 9 or described in the following discussion. Several of the steps could occur in a different order without affecting the final result.

In block 910, a decision-directed (DD) fractionally spaced equalizer (FSE) is provided.

In block 920, a finite impulse response filter is provided.

In block 930, a phase offset is detected using the DD FSE.

In block 940, filter tap updating is performed using the finite impulse response filter according to a least mean squares rule. Block 940 then terminates the process.

Figure 10:
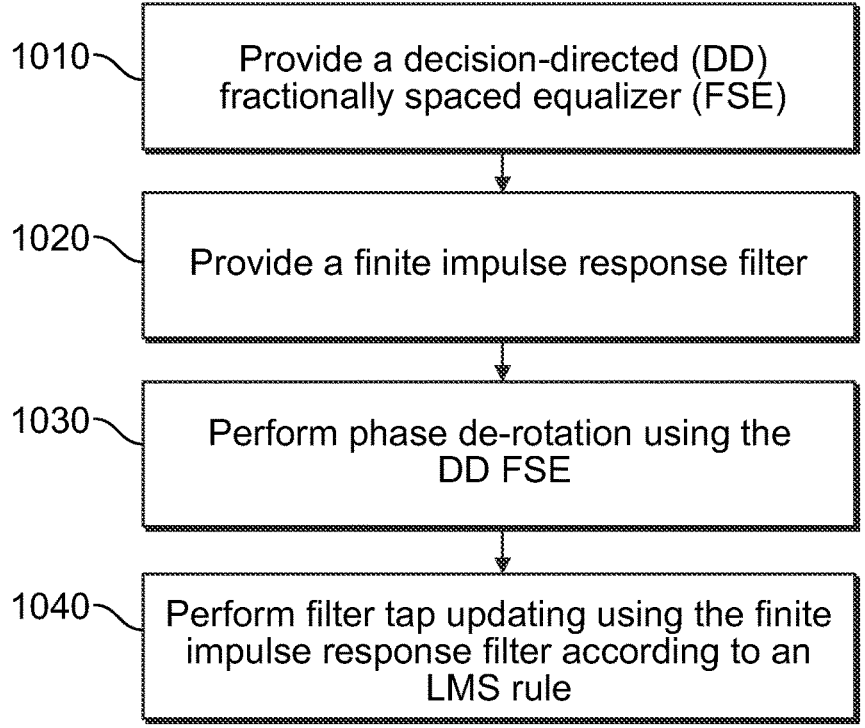
FIG. 10 is a flowchart of a method for blind equalization using a decision-directed fractionally spaced equalizer.

FIG. 10 is a flowchart of a method 1000 for blind equalization using a decision-directed fractionally spaced equalizer (FSE) and phase de-rotation. The order of the steps in the method 1000 is not constrained to that shown in FIG. 10 or described in the following discussion. Several of the steps could occur in a different order without affecting the final result.

In block 1010, a decision-directed (DD) fractionally spaced equalizer (FSE) equalizer is provided.

In block 1020, a finite impulse response filter is provided.

In block 1030, phase de-rotation is performed using the DD FSE.

In block 1040, filter tap updating is performed using the finite impulse response filter according to a least mean squares rule. Block 1040 then terminates the process.

Figure 11:
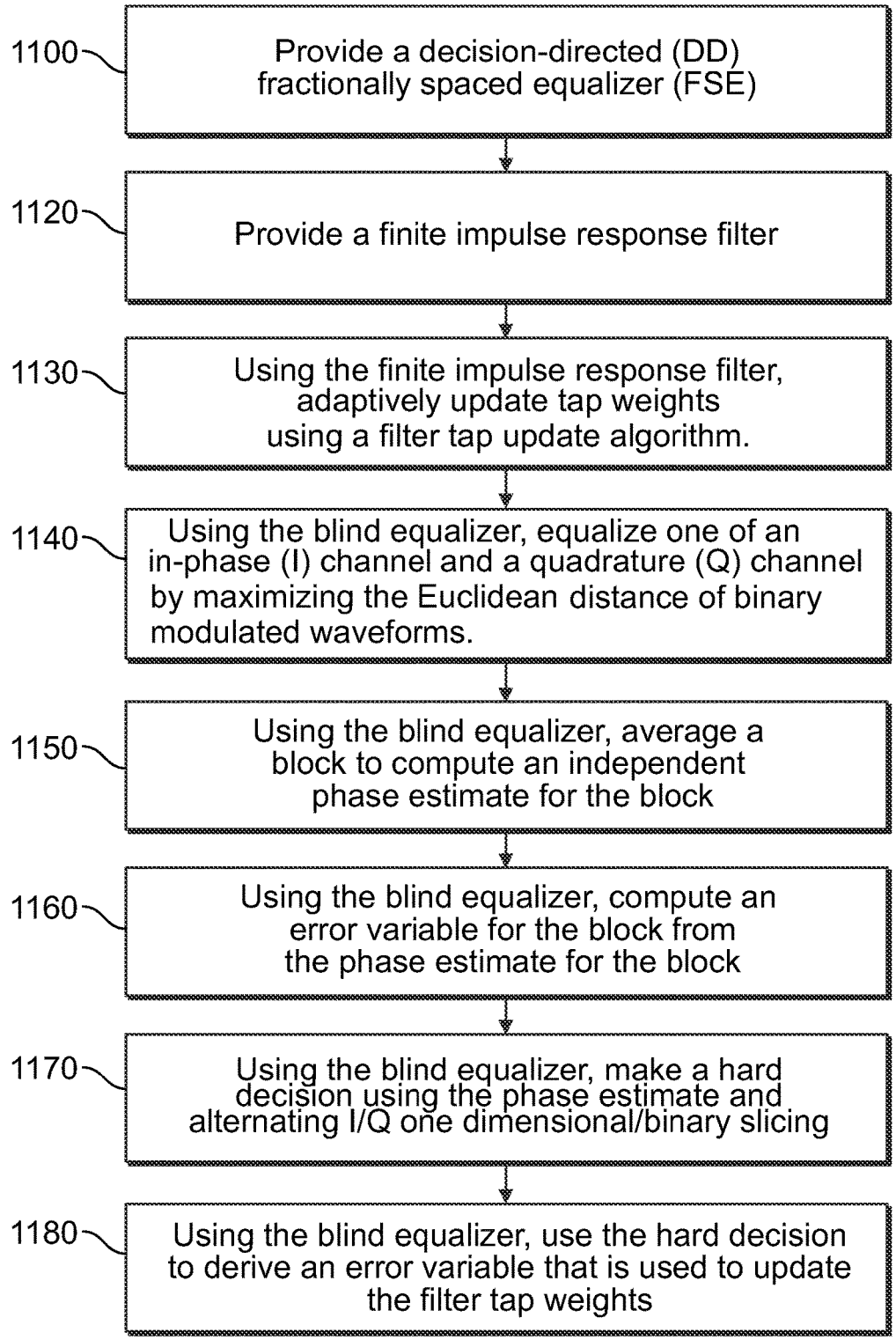
FIG. 11 is a flowchart of a method for blind equalization using a decision-directed least mean squares (LMS) blind equalizer and using alternating I/Q one dimensional/binary slicing to make a hard decision.

FIG. 11 is a flowchart of a method 1100 for blind equalization using a decision-directed least mean squares (LMS) blind equalizer and using alternating I/Q one dimensional/binary slicing to make a hard decision. The order of the steps in the method 1100 is not constrained to that shown in FIG. 11 or described in the following discussion. Several of the steps could occur in a different order without affecting the final result.

In block 1110, a decision-directed LMS blind equalizer is provided. Block 1110 then transfers control to block 1120.

In block 1120, a finite impulse response filter is provided. Block 1120 then transfers control to block 1130.

In block 1130, using the finite impulse response filter, tap weights are adaptively updated using a filter tap update algorithm. Block 1130 then transfers control to block 1140.

In block 1140, using the blind equalizer, one of an in-phase (I) channel and a quadrature (Q) channel is equalized by maximizing the Euclidean distance of binary modulated waveforms. Block 1140 then transfers control to block 1150.

In block 1150, using the blind equalizer, a block is averaged to compute an independent phase estimate for the block. Block 1150 then transfers control to block 1160.

In block 1160, using the bind equalizer, an error variable is computed for the block from the phase estimate for the block. Block 1160 then transfers control to block 1170.

In block 1170, using the blind equalizer, the phase estimate and alternating in-phase/quadrature (I/Q) one dimensional/binary slicing are used to make a hard decision. Block 1160 then transfers control to block 1180.

In block 1180, using the blind equalizer, the hard decision is used to derive an error variable that is used to update the filter tap weights. Block 1180 then terminates the process.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain fabrication steps and certain components can be altered without substantially impairing the functioning of the invention.

For example, the current treatment of estimated symbol values d̂(k) for odd and even k could be reversed, so that even k are treated as odd k currently are treated and vice versa.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

We claim:

1. A receiver system, comprising:
a decision-directed (DD) least mean squares (LMS) blind equalizer for equalizing a minimum shift keying (MSK) signal in a single carrier channel, the output signal of the DD LMS blind equalizer having, after equalizing approximately $5.11 \times 10^8$ MSK symbols, a non-zero phase offset $\theta_0$, the DD LMS equalizer further comprising a finite impulse response filter with tap weights that are adaptively updated using a filter tap update algorithm, the output signal having, after equalizing approximately $5.11 \times 10^8$ MSK symbols, a non-zero carrier frequency offset (CFO) $f_0$, wherein:
the DD LMS blind equalizer averages a block to compute an independent phase estimate for a block,
the DD LMS blind equalizer computes an error variable for a block from the phase estimate for the block,
the DD LMS blind equalizer uses the phase estimate and alternating in-phase/quadrature (I/Q) one dimensional/binary slicing to make a hard decision that does not comprise output of the receiver system, and
operating simultaneously in DD mode and as a blind equalizer, the DD LMS blind equalizer uses the hard decision to derive an error variable that is used to update the filter tap weights of the DD LMS equalizer.

2. The apparatus recited in claim 1, wherein:
the equalizer uses a staggered binary modulation.

3. The apparatus recited in claim 1, wherein:
in-phase channels (I channels) are orthogonal to quadrature channels (Q channels).

4. The apparatus recited in claim 3, further comprising:
a first snapshot buffer and a second snapshot buffer.

5. The apparatus recited in claim 4, wherein the filter tap update algorithm operates at a much lower rate without compromising performance.

6. The apparatus as recited in claim 3, wherein the in-phase (I) channels and the quadrature (Q) channels are equalized independently.

7. The apparatus as recited in claim 3, wherein as the tap weights are adaptively updated, the tap weights do not substantially diverge from optimal tap weights.

8. The apparatus of claim 1, wherein the blind equalizer can operate without a requirement for one of a phase lock and a frequency lock.

9. The apparatus of claim 1, wherein the blind equalizer functions in an environment with one or more of channel distortion and additive white Gaussian noise (AWGN).

10. The apparatus of claim 1, wherein the filter tap update algorithm updates the tap weights by tracking a rate of change of channel distortion.

11. A method for blind equalization, comprising:
adaptively updating tap weights of a decision-directed (DD) least mean squares (LMS) blind equalizer using a filter tap update algorithm and a finite impulse response filter, the DD LMS blind equalizer being comprised in a receiver system and being configured for equalizing a minimum shift keying (MSK) signal in a single carrier channel, the output signal of the DD LMS blind equalizer having, after equalizing approximately $5.11 \times 10^8$ MSK symbols, a non-zero phase offset $\theta_0$, the output signal having, after equalizing approximately $5.11 \times 10^8$ MSK symbols, a non-zero carrier frequency offset (CFO) $f_0$;
using the DD LMS blind equalizer, averaging a block to compute an independent phase estimate for the block;
using the DD LMS blind equalizer, computing an error variable for a block from the phase estimate for the block;
using the DD LMS blind equalizer, using the phase estimate and alternating in-phase/quadrature (I/Q) one dimensional/binary slicing to make a hard decision that does not comprise output of the receiver system; and
using the DD LMS blind equalizer, operating simultaneously in DD mode and as a blind equalizer, using the hard decision to derive an error variable that is used to update filter tap weights of the DD LMS equalizer.

12. The method of claim 11, wherein:
the step of equalizing comprises using a staggered binary modulation.

13. The method of claim 11, wherein the step of updating comprises operating the filter tap update algorithm at a much lower rate without compromising performance.

14. The method of claim 11, wherein the step of equalizing comprises independently equalizing the in-phase (I) channels and the quadrature (Q) channels.

15. The method of claim 11, wherein the step of updating comprises adaptively updating the tap weights so that they do not substantially diverge from optimal tap weights.

16. The method of claim 11, wherein the step of averaging comprises operating without a requirement for one of a phase lock and a frequency lock.

17. The method of claim 11, wherein the step of equalizing comprises functioning in an environment with one or more of channel distortion and additive white Gaussian noise (AWGN).

18. The method of claim 11, wherein the step of updating comprises tracking a rate of change of channel distortion.

* * * * *